Aug. 20, 1957     F. C. BROKISH     2,803,074
GATE
Filed July 6, 1956

INVENTOR.
FRANK C. BROKISH
BY
McMorrow, Berman & Davidson
ATTORNEYS

United States Patent Office 2,803,074
Patented Aug. 20, 1957

2,803,074

GATE

Frank C. Brokish, Dodgeville, Wis.

Application July 6, 1956, Serial No. 596,299

1 Claim. (Cl. 39—87)

This invention relates to gates, and more particularly to a gate of the type provided with an auxiliary passageway therein.

A main object of the invention is to provide a novel and improved farm gate of the type provided with an auxiliary passage therethrough having an adjustable closure member associated therewith, the gate being simple in construction, being easy to manipulate, and being provided with means for adjustably securing the auxiliary closure member thereof in a selected elevated position in the main frame of the gate.

A further object of the invention is to provide an improved farm gate of the type having an auxiliary passageway therethrough provided with its own closure means, whereby small animals may pass through the gate without the necessity of the gate being opened in its entirety, and whereby the auxiliary closure means may be adjustably secured in an elevated position so that smaller animals may pass through the gate whereas larger animals will be restrained against passage, the improved gate being inexpensive to manufacture, being sturdy in construction, and being neat in appearance.

Further objects and advantages of the invention will become apparent from the following description and claim, and from the accompanying drawings, wherein:

Figure 1:
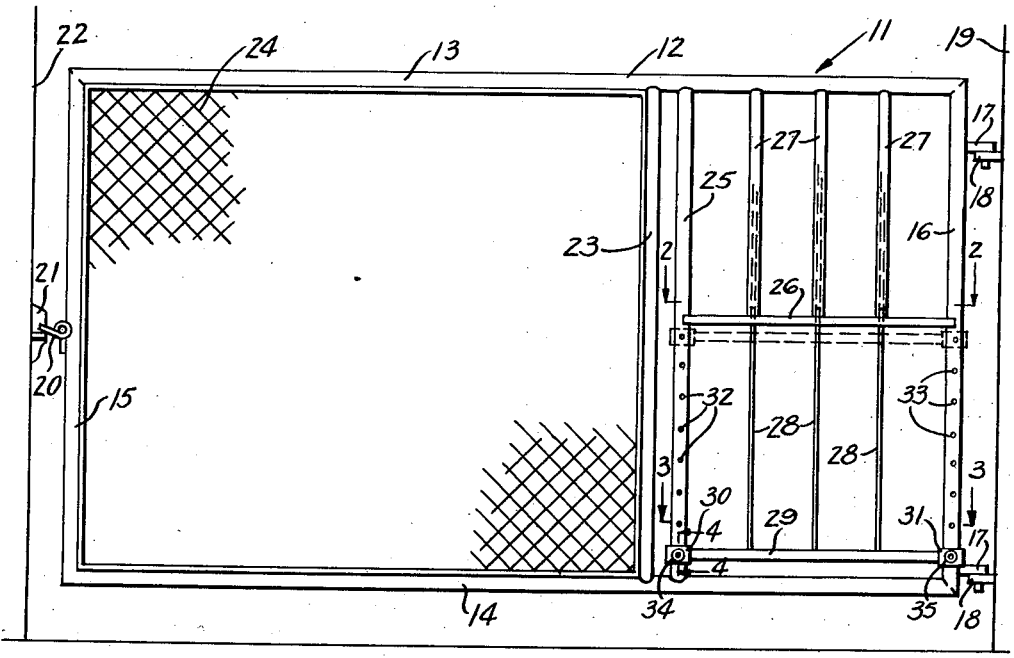
Figure 1 is a front elevational view of an improved farm gate constructed in accordance with the present invention.
Figure 2:
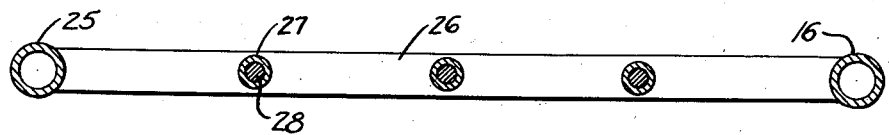
Figure 2 is an enlarged horizontal cross sectional view taken on the line 2—2 of Figure 1.

Referring to the drawings, the improved gate is generally designated at 11 and comprises a rectangular main outer frame 12 having the top and bottom frame members 13 and 14 and the respective vertical end members 15 and 16.

As shown, the end member 16 is provided with hinge loops 17, 17 which may be pivotally connected to the respective vertically aligned mating hinge loops 18, 18 secured to a post or other stationary vertical support 19, whereby the frame 12 is swingable a vertical axis defined by the connected pairs of hinge loops 17 and 18.

The outer end member 15 of frame 12 is provided with detent means 20 interengageable with a cooperating detent member 21 secured on a post or other stationary vertical support 22, whereby the frame 12 may be releasably held in closed position, as illustrated in Figure 1.

Rigidly secured to the intermediate portions of the top and bottom members 13 and 14, at a location spaced from and adjacent to the end member 16 is a vertical bar member 23 of material similar to that employed for the other elements of the frame, for example, of metal tubing. Permanently secured in the rectangular area defined between the vertical members 15 and 23 and the top and bottom members 13 and 14 is a main panel element 24 of wire mesh or other suitable material.

Rigidly secured to the top and bottom members 13 and 14 adjacent to the vertical bar member 23 is a vertical bar member 25 which, as shown, is parallel to and which is relatively closely spaced to the vertical bar member 23. Designated at 26 is a horizontal flat bar which rigidly interconnects the intermediate portion of the vertical end bar 16 and the vertical inner bar 25. Secured between the horizontal bar 26 and top bar 13 are a plurality of evenly spaced vertical tubular members 27, the tubular members 27 and the flat bar 26 being rigidly secured to the top and bottom members 13 and 14 and to the vertical members 25 and 16 to define a panel element in the end portion of the frame located in side-by-side relationship to the main panel 24.

The horizontal bar 26 is apertured to register with the bores of the respective vertical bars 27, and telescopically received in said tubular bars 27 are a plurality of vertical rods 28 rigidly secured at their bottom ends to a horizontal bar member 29. Rigidly secured to the opposite ends of the bar members 29 are the respective collar elements 30 and 31 which are slidably engaged on the respective vertical frame members 25 and 16.

Figure 3:
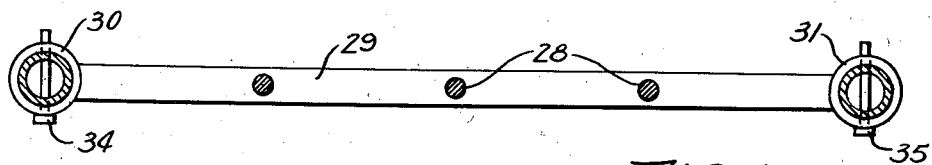
Figure 3 is an enlarged horizontal cross sectional view taken on the line 3—3 of Figure 1.

The lower portions of the vertical members 25 and 16 are formed with the spaced sets of diametrically aligned apertures 32 and 33 through which may be engaged retaining pins 34 and 35 extending transversely through the respective collars 30 and 31, as shown in Figure 3. The headed retaining pins 34 and 35 may be provided at their end portions with removable cotter pins 36, as shown in Figure 4, to hold the retaining pins in place, so that the vertically adjustable closure defined by bar 29 and vertical rods 28 may be adjustably secured in a desired elevated position in the main frame 12 to define a passageway of the desired size between the bar member 29 and the bottom frame bar 14.

Figure 4:
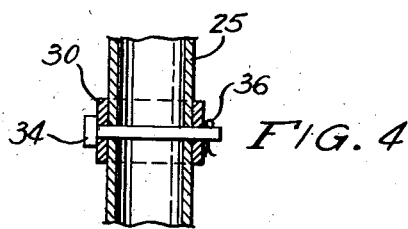
Figure 4 is an enlarged vertical cross sectional detail view taken on the line 4—4 of Figure 1.

As will be readily apparent, the horizontal bar 29 may be secured at a desired elevation by engaging the pins 34 and 35 through selected pairs of openings 32 and 33 in the bars 25 and 16, the pins being held in position by the cotter pins 36 provided at their end portions, as illustrated in Figure 4. Thus, an opening may be provided in the gate of sufficient size to allow small animals to pass freely therethrough, whereas the gate may remain closed to prevent the passage therethrough of larger animals.

While a specific embodiment of an improved farm gate has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a gate, a rectangular main outer frame, a main panel element fixedly secured in said main frame, a plurality of vertical depending tubular rod elements secured to the top portion of said main frame coplanar with said frame and located laterally adjacent said main panel element, a horizontal bar member provided with collar elements at the opposite ends thereof slidably engaged with said main frame, said horizontal bar member being located below said rod elements, upwardly extending vertical rods secured to said horizontal bar member and telescopically engaged with said first-named rod elements, and means extending through said collar elements and engaging said main frame for adjustably securing said horizontal bar member in elevated position in said main frame.

References Cited in the file of this patent

UNITED STATES PATENTS

| | | |
|---|---|---|
| 1,132,438 | Carr | Mar. 16, 1915 |
| 2,661,971 | Reymann | Dec. 8, 1953 |
| 2,701,927 | Dyer | Feb. 15, 1955 |
| 2,769,259 | Gunderson | Nov. 6, 1956 |